US012122593B2

(12) United States Patent
Watts

(10) Patent No.: US 12,122,593 B2
(45) Date of Patent: Oct. 22, 2024

(54) APPARATUS FOR RETAINING FLOWABLE SOLID MATERIALS

(71) Applicant: Calvin Watts Construction Ltd, Kent (GB)

(72) Inventor: Calvin Watts, Kent (GB)

(73) Assignee: Calvin Watts Contruction Ltd, Kent (GB)

( * ) Notice: Subject to any disclaimer, the term of this patent is extended or adjusted under 35 U.S.C. 154(b) by 0 days.

(21) Appl. No.: 17/397,980

(22) Filed: Aug. 9, 2021

(65) Prior Publication Data

US 2022/0089364 A1 Mar. 24, 2022

(30) Foreign Application Priority Data

Sep. 22, 2020 (GB) ...................................... 2014956
Oct. 2, 2020 (GB) ...................................... 2015661
May 5, 2021 (GB) ...................................... 2106423

(51) Int. Cl.

| | |
|---|---|
| ***B65D 1/24*** | (2006.01) |
| ***B65B 67/12*** | (2006.01) |
| ***B65B 69/00*** | (2006.01) |
| ***B65D 25/04*** | (2006.01) |
| ***B65F 1/00*** | (2006.01) |
| ***B65F 1/14*** | (2006.01) |

(52) U.S. Cl.

CPC ............ *B65F 1/1415* (2013.01); *B65B 67/12* (2013.01); *B65B 69/0033* (2013.01); *B65D 1/24* (2013.01); *B65D 25/04* (2013.01); *B65F 1/004* (2013.01)

(58) Field of Classification Search

CPC .......... B65D 1/24; B65D 25/04; B65D 25/02; B65D 25/00; B65B 69/0033; B28C 7/0463

See application file for complete search history.

(56) References Cited

U.S. PATENT DOCUMENTS

| | | | | |
|---|---|---|---|---|
| 3,341,876 A | 9/1967 | Campbell | | |
| 6,648,165 B1 * | 11/2003 | Accardo | E04F 21/02 | 220/495.01 |
| 2005/0042335 A1 | 2/2005 | Stock | | |
| 2006/0169705 A1 * | 8/2006 | Pool | E04F 21/02 | 220/629 |
| 2016/0176576 A1 * | 6/2016 | Schreiber | B65D 25/04 | 220/523 |
| 2017/0021957 A1 | 1/2017 | Gartz | | |
| 2020/0109004 A1 | 4/2020 | Martin, Jr. | | |

FOREIGN PATENT DOCUMENTS

| | | |
|---|---|---|
| DE | 202008017322 U1 | 5/2009 |
| DE | 16331 U1 | 7/2019 |
| EP | 0359847 A1 | 3/1990 |
| GB | 732078 | 6/1955 |
| GB | 732078 A * | 6/1955 |

OTHER PUBLICATIONS

Examination Report in GB2016423.3 (Mar. 27, 2024) (2 pages).
Examination Report in GB2015661.8 (Mar. 16, 2024) (4 pages).

* cited by examiner

*Primary Examiner* — Javier A Pagan

(57) ABSTRACT

Apparatus for receiving and retaining the contents of a bag of flowable material comprises a rectangular base bordered on two sides by upstanding walls. An upstanding dividing member is positioned between and generally co-extensive with said walls to define two separate compartments. The dividing member includes a narrow upper edge on which a bag of flowable material can be supported with the two overlying sides or ends of the bag extending downwardly one into each said compartment.

4 Claims, 1 Drawing Sheet

APPARATUS FOR RETAINING FLOWABLE SOLID MATERIALS

CROSS-REFERENCE TO RELATED APPLICATIONS

This application claims priority from GB Patent Application Nos. 2014956.3 filed Sep. 22, 2020; 2015661.8 filed Oct. 2, 2020; and 2106423.3 filed May 5, 2021, the contents of which are incorporated herein by reference in their entireties.

TECHNICAL FIELD

This disclosure relates to apparatus for enabling bags of flowable solid materials such as cement, sand, gravel, top-soil, compost, chip bark and the like to be divided into discrete opened sections without undue loss of the bagged contents.

BACKGROUND

When opening a bag of a flowable solid material such as cement it is often the case that a quantity of the material is lost through spillage and/or mishandling. Indeed, because of the weight and shape of, for example, a cement bag, it is extremely difficult not to lose a significant amount of the contents during the opening process.

DETAILED DESCRIPTION

Figure 1:
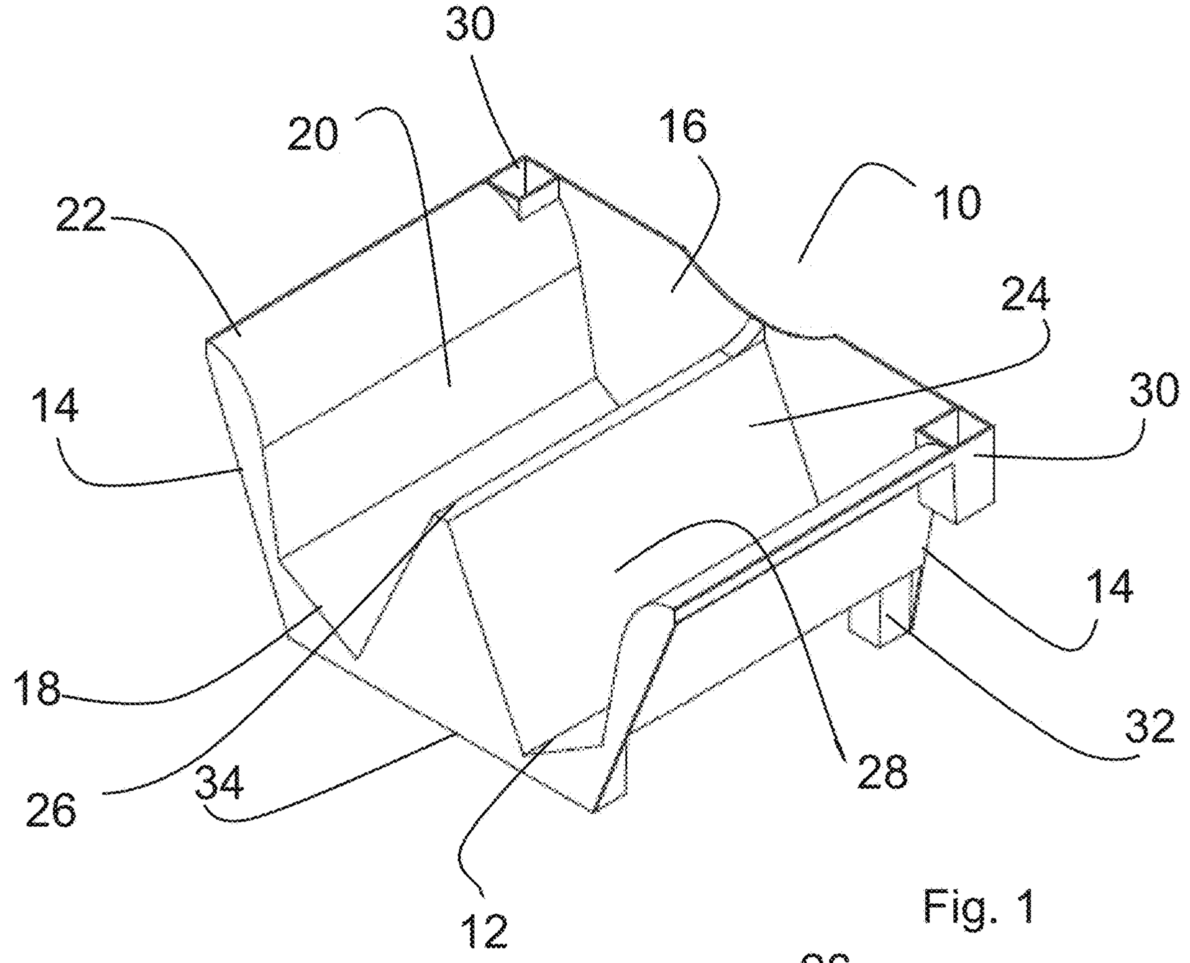
FIG. 1 is isomeric view of apparatus constructed in accordance with this description.
Figure 2:
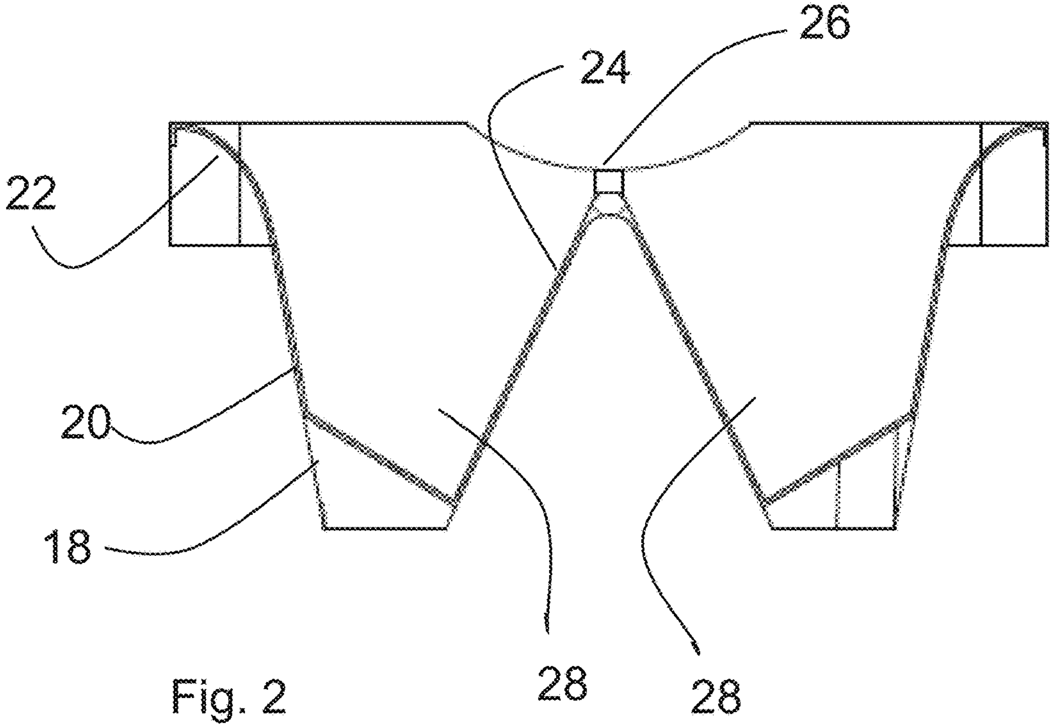
FIG. 2 is an end cross section view of the apparatus of FIG. 1.

The present disclosure sets out to provide apparatus designed to eliminate or at least minimize losses of contents during the opening process of bagged flowable solid materials.

In one aspect, there is provided apparatus for receiving and retaining the contents of bagged flowable solid materials, the apparatus comprising a base bordered by upstanding side walls and an end wall, an upstanding dividing member positioned substantially midway between and generally co-extensive with said side walls to define with the side walls and end wall two separate compartments open at one end, the dividing member including an upper edge on which a bag of flowable material can be supported with the two sides or ends of the bag overlapping the edge and extending downwardly one into each of the two said separate compartments, the arrangement being such that cutting the bag along the area supported by the edge causes the divided cut sections of the bag to locate one within each of the two compartments defined between the dividing member and the respective side wall of the apparatus.

The dividing member is preferably generally triangular in cross section with the top of the member defining the apex of the triangle.

Each of the side walls may include a generally vertical lower section and an outwardly extending upper section. An outwardly extending lip may be provided along the upper edge of one or each side wall.

The top of the dividing member may be shaped to define a narrow ridge for ease of cutting a bag supported by the ridge of the dividing member.

The ridge surface may be flat or curvilinear.

Alternatively, the rim surface of the dividing member may comprise or include a lengthwise extending upstanding cutting tool.

The floor of each side section may be inclined upwardly towards the respective side wall.

The illustrated apparatus comprises a generally rectangular open-topped container or vessel 10 which comprises a base 12, a pair of opposed upstanding side walls 14 and a rear wall 16.

The fourth side of the container is open. Each side wall 14 has a lower section 18 whose inner surface is inclined upwardly from the base 12, a middle section 20 extending generally vertically from the lower section 18 and an upper section 22 forming an outwardly curved radius.

Positioned between the two side walls 14 is a generally centrally located dividing wall structure 24. The dividing structure 24 has the general form of a prism having inclined side walls extending from the base 12 and forming a relatively narrow flattened ridge 26 at their juncture which extends lengthwise along the entire length of the dividing wall structure 24.

The opposed surfaces of the side walls 14 and the dividing structure 24 define, with the rear wall 16, a pair of channels 28 which are open at one end.

The height of the ridge 26 above the base 12 is less than that of the sides of the container 10. Alternatively, these heights may be the same or the height of the ridge 26 may be greater than the heights of the container side walls 14.

Corner structures 30 formed in the molding of the container 10 provide pockets for retaining tools including, for example, a cutting blade for opening bags of flowable material.

The container 10 is raised off the ground by a foot 32 in each corner. The front of the base 12 has a downwardly extending support flange 34 to provide stability to the container 10, particularly if several containers are stacked for storage.

Further support flanges or bridges (not shown) may be provided on the underside of the container 10 to provide strength to the side walls of the dividing structure 24.

The container 10 may be constructed from a wide variety of materials, these including fiberglass, plastics, metal or even treated wood. A preferred material is 2 mm to 10 mm UV resistant plastics material, preferably recycled.

In use, a bag of flowable solid material such as cement is laid lengthwise or width-wise over the ridge 26 so that each side or end of the bag folds downwardly away from the ridge 26 and towards the base 12 with consequent movement of the bag contents towards the folded sides of the bag. The bag is then cut along the line of the ridge 26 to cause each bag side or end and its contents to fall downwardly into the respective channel. In this way, losses of the bag contents are eliminated or, at least, minimized. The open front of each channel allows easy un-obstructed access to the bag part and contents in each channel such that the bag part and its contents does not need to be moved or re-positioned avoiding any subsequent risk of spillage.

Once loaded, the apparatus can readily be employed to carry the opened bag from one location to another, or to store the opened bag for future use. In the latter case a lid may be provided to fit over the container 10.

The rear wall 16 may be extendible to allow for bags of larger dimension. In such circumstance the container 10 may have a separate section located centrally and having sleeves into which the two channel sections can fit and slide within.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

It will be appreciated that the foregoing is merely exemplary of apparatus in accordance with the invention and that modifications can readily be made thereto without departing from the true scope of the invention as set out in the appended claims.

The invention claimed is:

1. Apparatus for receiving and retaining the contents of bagged flowable solid materials, the apparatus comprising:

a flat base bordered by upstanding side walls and an end wall;

feet to raise the flat base off the ground; and an upstanding dividing member positioned substantially midway between and generally co-extensive with said side walls to define with the side walls and end wall two separate compartments open at one side end, the dividing member including an upper edge structured to support a bag of flowable material with two sides or ends of the bag overlapping the upper edge and extending downwardly one into each of the two said separate compartments, wherein each side wall has a lower section whose inner surface is inclined upwardly from the flat base and the floor of each compartment is inclined upwardly towards the respective side wall the arrangement being such that cutting the bag along the area supported by the dividing member causes divided cut sections of the bag and contents to locate one within each of the two compartments defined between the dividing member and the respective side wall of the apparatus.

2. Apparatus as claimed in claim 1 wherein the dividing member is generally triangular in cross section with a top of the dividing member defining an apex of a triangle.

3. Apparatus as claimed in claim 1 wherein a top of the dividing member is shaped to define a narrow ridge for ease of cutting the bag supported by the rim of the dividing member.

4. Apparatus as claimed in claim 3 wherein the ridge includes a lengthwise extending upstanding cutting tool.

* * * * *